US008848522B2

(12) United States Patent
Yumoto et al.

(10) Patent No.: US 8,848,522 B2
(45) Date of Patent: Sep. 30, 2014

(54) TELECOMMUNICATIONS SYSTEM AND SERVER APPARATUS

(75) Inventors: Kazuma Yumoto, Fuchu (JP); Takuji Kawai, Ebina (JP)

(73) Assignee: Hitachi, Ltd., Tokyo (JP)

( * ) Notice: Subject to any disclaimer, the term of this patent is extended or adjusted under 35 U.S.C. 154(b) by 724 days.

(21) Appl. No.: 12/389,136

(22) Filed: Feb. 19, 2009

(65) Prior Publication Data

US 2009/0316600 A1 Dec. 24, 2009

(30) Foreign Application Priority Data

Jun. 23, 2008 (JP) ................................ 2008-162883

(51) Int. Cl.
| | | |
|---|---|---|
| *G01R 31/08* | (2006.01) | |
| *H04L 12/28* | (2006.01) | |
| *H04L 12/46* | (2006.01) | |
| *H04L 12/24* | (2006.01) | |

(52) U.S. Cl.
CPC ................ *H04L 12/24* (2013.01); *H04L 41/22* (2013.01); *H04L 12/4641* (2013.01); *H04L 41/0893* (2013.01); *H04L 41/00* (2013.01)
USPC ............ 370/230; 370/231; 370/236; 370/254

(58) Field of Classification Search
USPC .............................................. 370/230–236.1
See application file for complete search history.

(56) References Cited

U.S. PATENT DOCUMENTS

| | | | | |
|---|---|---|---|---|
| 7,486,696 | B2 * | 2/2009 | Garg et al. ..................... | 370/468 |
| 7,684,322 | B2 * | 3/2010 | Sand et al. ..................... | 370/230 |
| 2003/0103510 | A1 * | 6/2003 | Svanberg et al. .......... | 370/395.2 |
| 2008/0095054 | A1 * | 4/2008 | Morford ....................... | 370/231 |

FOREIGN PATENT DOCUMENTS

| | | |
|---|---|---|
| JP | 2001-251307 | 9/2001 |
| JP | 2003-069635 | 3/2003 |
| JP | 2005-039644 | 2/2005 |
| JP | 2006-345173 | 12/2006 |

* cited by examiner

*Primary Examiner* — Brandon Renner
(74) *Attorney, Agent, or Firm* — Brundidge & Stanger, P.C.

(57) ABSTRACT

In a telecommunications carrier network system to provide such a service that a global IP network can be used as a communication infrastructure of a company, especially in a network system in which a setting interface is opened so that a user can freely perform a setting change on a use service, plural users can simultaneously perform setting changes. In a control request classified unit to classify a setting change request from a user terminal, request contents are classified for each of control target node equipments and each of interfaces, and are stored in a control request management unit. An admission control unit collectively judges admission or nonadmission of the request for each of control targets. A control request publishing unit collectively orders admissible requests to the same node equipment also when setting update to the node equipment is performed.

18 Claims, 18 Drawing Sheets

SEQUENCE VIEW
(FLOW OF WHOLE PROCESSING)

TABLE STRUCTURE VIEW
(CONTROL REQUEST MANAGEMENT UNIT)

21

| # | TARGET NODE TARGET IF | CHANGE CONTENT | DIFF | REQ-ID | STATUS |
|---|---|---|---|---|---|
| 1 | NODE001, IF01 | VPN-ID=0123, 3M→10M | +7M | 0100 | OK |
| 2 | NODE001, IF01 | VPN-ID=0456, 10M→8M | -2M | 0110 | OK |
| 3 | NODE001, IF02 | VPN-ID=0789, 1M→3M | +2M | 0101 | NON |
|   | : | : | : | : |   |
| 10 | NODE010, IF01 |   | +5M | 0101 | OK |
| 11 | NODE010, IF01 |   | +10M | 0105 | NG |
|   | : | : | : | : |   |

FIG.4

STRUCTURE IMAGE OF PROCESSING QUEUE
(INTEGRAL QUEUE MODEL)

Ⓐ : REQUEST CLASSIFICATION WAITING

Ⓑ : ADMISSION JUDGMENT WAITING

Ⓒ : CONTROL REQUEST PUBLISHING WAITING

TABLE STRUCTURE VIEW
OF CONTROL TARGET MANAGEMENT UNIT

18

| TARGET NODE IDENTIFIER (130) | TARGET INTERFACE IDENTIFIER (132) |
|---|---|
| CORE NODE EQUIPMENT 6c | INTERFACE #1 |
| CORE NODE EQUIPMENT 6d | INTERFACE #1 |
| EDGE NODE EQUIPMENT 5a | INTERFACE #1 |
| EDGE NODE EQUIPMENT 5a | INTERFACE #2 |
| : | |
| EDGE NODE EQUIPMENT 5c | INTERFACE #n |

FIG.13

TABLE STRUCTURE VIEW
OF RESOURCE MANAGEMENT UNIT

19

| NODE IDENTIFIER | IF IDENTIFIER | UPPER LIMIT BAND | RESERVED BAND |
|---|---|---|---|
| CORE NODE EQUIPMENT 6c | INTERFACE #1 | 1G | 500M |
| : | : | : | : |
| EDGE NODE EQUIPMENT 5a | INTERFACE #1 | 100M | 30M |
| : | : | : | : |

TABLE STRUCTURE VIEW
OF ROUTE INFORMATION MANAGEMENT UNIT

17

| VPN-ID | TRANSMISSION SOURCE | TRANSMISSION DESTINATION | ROUTE INFORMATION (NODE EQUIPMENT IDENTIFIER, INTERFACE IDENTIFIER) |
|---|---|---|---|
| 0123 | 5a | 5c | 5a→6a→6c→6d→6b→5c |
| 0456 | 5b | 5c | 5b→6a→6c→6d→6b→5c |
| ⋮ | ⋮ | ⋮ | ⋮ |

FIG.15

CONTRACT INFORMATION TABLE

| USER IDENTIFIER (160) | LOCATION IDENTIFIER (162) | CONTRACT BAND (164) |
|---|---|---|
| USER #1 | TOKYO A | 1000M |
| : | : | : |
| USER #1 | OSAKA C | 500M |
| USER #2 | : | : |

FIG.16

SETTING INFORMATION TABLE

| USER IDENTIFIER 170 | LOCATION IDENTIFIER 172 | VPN-ID 174 | BAND 176 | PRIORITY 178 |
|---|---|---|---|---|
| USER #1 | TOKYO A | 0123 | 100 | 7 |
| : | : | : | : | : |
| USER #1 | OSAKA C | 0125 | : | : |
| USER #2 | : | : | : | : |

FIG.17

TELECOMMUNICATIONS SYSTEM AND SERVER APPARATUS

CLAIM OF PRIORITY

The present application claims priority from Japanese patent application JP 2008-162883 filed on Jun. 23, 2008, the content of which is hereby incorporated by reference into this application.

BACKGROUND OF THE INVENTION

1. Field of the Invention

The present invention relates to a telecommunications system and a server apparatus, and particularly to a telecommunications system and a server apparatus, in which a network resource is controlled in a system constituting a virtual private network in which telecommunications carriers provide services.

2. Description of the Related Art

As a contrivance to use a global IP network as a telecommunications infrastructure of a company, there are services provided by telecommunications carriers, called global Ethernet (registered trade mark in Japan) or an IP Virtual Private Network (IP-VPN). In these services, a service request from an end user, such as an increase or decrease of locations, or a change of a VPN band is processed in such a flow that contact is made with a network service provider in writing or through form input, the service provider receiving the request takes the resource use state of network equipments to judge admission or non-admission of the request, and performs a setting change to the network equipments.

A flow of service change from a user when a carrier to provide a VPN and a carrier to provide a global IP network configuring the VPN are different from each other is disclosed in, for example, FIG. 1 of patent document 1. A service request from an end user in this case is processed in such a form that a user side VPN administrator mediates and an application is made to an administrator of the global IP network. In the technique of patent document 1, as a contrivance to reduce a time lag between the occurrence of a service request and the actual execution of a service change, a VPN policy management apparatus is disclosed which stores both a global IP network policy and a VPN policy, and performs verification of the VPN policy to the global IP network and service request verification to the VPN policy.

In patent document 2, as a contrivance to shorten a response time to a resource allocation request of a VPN spreading over a global IP network, an IP-VPN policy server is disclosed in which resource information of a communication equipment allocated as a policy of the IP-VPN global network is set as VPN resource information in the VPN policy server.

On the other hand, patent document 3 discloses a method in which when traffics are concentrated from plural user node equipments to one user node equipment, a band is ensured for each transmission source user node equipment, and in accordance with the amount of data received from a certain user node equipment, an output speed from another user node equipment is changed.

Further, patent document 4 discloses a method in which plural user request receiving units are provided, so that a processing load of a user request unit is reduced to suppress a reduction in performance, and performance reduction in the entire admission control function is avoided.

[Patent document 1] JP-A-2001-251307
[Patent document 2] JP-A-2005-39644
[Patent document 3] JP-A-2006-345173
[Patent document 4] JP-A-2003-69635

SUMMARY OF THE INVENTION

One of the matters to be solved by the invention is to provide a setting interface in which in a telecommunications carrier network system to provide such a service that a global IP network can be used as a telecommunications infrastructure of a company, a user can change a setting on a use service as quickly as the user changes a setting of an equipment of his/her own company.

Particularly, when the setting interface as stated above is opened to users, there is a possibility that plural users perform setting changes on equipments of the telecommunications carrier network. Thus, even when plural change requests occur, it is necessary that the respective change requests are reflected while the standby times of the users are reduced, and the setting changes of the network equipments are performed while an adjustment is made so that inconsistency and unconformity do not occur in the telecommunications carrier network.

Patent document 1 and patent document 2 do not disclose the matter when plural users issue the change requests.

Although patent document 3 discloses the band control method in the case where traffics are concentrated at one user node equipment from plural user node equipments, the document does not consider judgment and control in the case where newly generated plural requests cause traffic concentration at the same user node equipment.

Although patent document 4 discloses the method of reducing the processing load of the user request unit by providing the plural user request receiving units, the document does not consider a transfer apparatus influenced by plural user requests and a case where links overlap. Although the document discloses the case where the range of the user requests spreads over plural band management units, the judgment process is performed one by one in order of requests. Thus, when plural requests to a certain band management unit occur, it takes much time before the final request is processed, and there is a possibility that the promptness is lost.

In view of the above, it is an object of the invention to provide a telecommunications system and a server apparatus, in which even when plural users issue setting change requests, standby times of the users are reduced, a control is made so that inconsistency and unconformity do not occur in the telecommunications carrier network, and the setting changes of network equipments are performed.

According to an aspect of the invention, when it is judged whether a user request can be admitted or not, in addition to reference to actual resource information whose setting is reflected in a node equipment, request contents previously stored in a queue to manage duplicate user requests is considered and the admission judgment is performed.

Further, according to another aspect of the invention, when setting update of a node equipment is performed, plural request contents approved by the admission judgment of user requests are collectively ordered.

According to the first solving means of this invention, there is provided a telecommunications system comprising:

a plurality of node equipments that constitute a network to connect a plurality of user networks, and changes setting information of a logical line between the user networks in accordance with a control request;

a terminal to transmit the setting information; and a server apparatus that receives the setting information from the terminal and transmits the control request to the node equipment, wherein the terminal includes:

an input unit to input the setting information of the logical line between the user networks; and a transmission unit to transmit the setting information to the sever apparatus, and wherein the server apparatus includes:

a reception unit to receive the setting information from the terminal;

a classification unit to classify the setting information received by the reception unit for each of the node equipments on a route of the logical line and each of interfaces of the node equipments;

a request management unit to store the setting information classified by the classification unit for each of the node equipments and each of the interfaces of the node equipments;

a resource storage unit to store band information of a physical line connected to each of the interfaces of the node equipments;

an admission control unit to judge whether the setting information is admissible or inadmissible based on the band information of the physical line and the setting information of the logical line with respect to the interface of each of the node equipments; and a control request publishing unit to generate the control request to the node equipment based on the setting information of the logical line, which is judged to be admissible by the admission control unit.

According to the second solving means of this invention, there is provided a server apparatus in a telecommunications system including a plurality of node equipments that constitute a network to connect a plurality of user networks and changes setting information of a logical line between the user networks in accordance with a control request, a terminal to transmit the setting information, and the server apparatus that receives the setting information from the terminal and transmits the control request to the node equipment, the server apparatus comprising:

a reception unit to receive the setting information of the logical line between the user networks from the terminal;

a classification unit to classify the setting information received by the reception unit for each of the node equipments on a route of the logical line and each of interfaces of the node equipments;

a request management unit to store the setting information classified by the classification unit for each of the node equipments and each of the interfaces of the node equipments;

a resource storage unit to store band information of a physical line connected to each of the interfaces of the node equipments;

an admission control unit to judge whether the setting information is admissible or inadmissible based on the band information of the physical line and the setting information of the logical line with respect to the interface of each of the node equipments; and a control request publishing unit to generate the control request to the node equipment based on the setting information of the logical line, which is judged to be admissible by the admission control unit.

According to the invention, it is possible to provide a telecommunications system and a server apparatus, in which even when plural users issue setting change requests, standby times of the users are reduced, a control is made so that inconsistency and unconformity do not occur in the telecommunications carrier network, and the setting changes of network equipments are performed.

BRIEF DESCRIPTION OF THE DRAWINGS

FIG. 4 is a view showing an example of a structure of a control request management table of an embodiment.

FIG. 13 is a view showing an example of a structure of a control target management table.

FIG. 14 is a view showing an example of a structure of a resource management table.

FIG. 15 is a view showing an example of a structure of a route information management table.

FIG. 16 is a view showing an example of a structure of a contract information management table.

FIG. 17 is a view showing an example of a structure of a setting information management table.

DETAILED DESCRIPTION OF THE PREFERRED EMBODIMENTS

Hereinafter, embodiments of the invention will be described with reference to the drawings.

Figure 1:
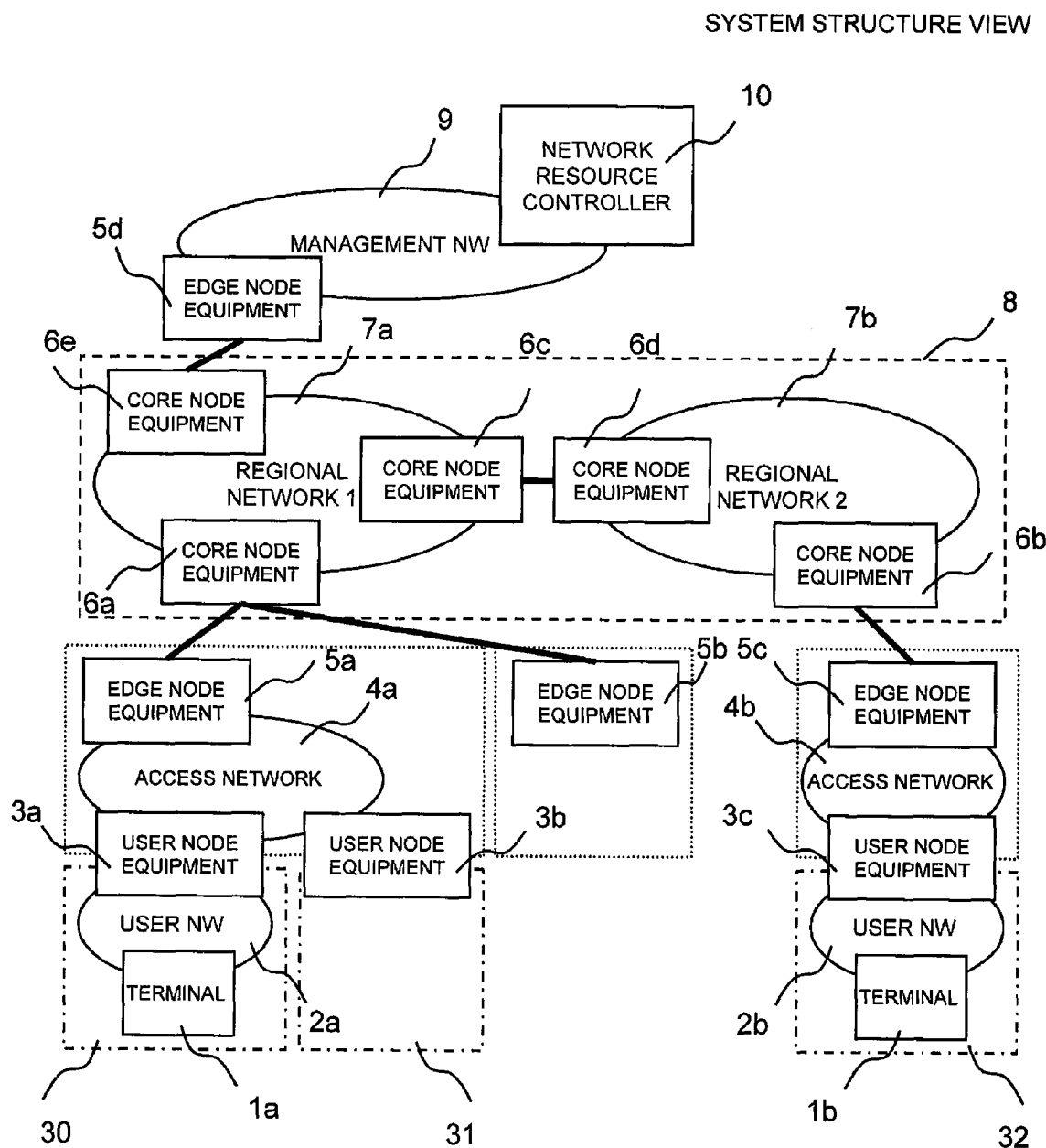
FIG. 1 is a network structure view showing an example of an embodiment of the invention.

FIG. 1 is a network structure view showing an example of an embodiment.

A telecommunications carrier (or electronic communication company) provides a service of a global IP network as a telecommunications infrastructure to connect networks (user networks 2) of the same company extending over plural regional locations.

Each of the user networks 2 and a network provided by the telecommunications carrier are connected through an access network 4. The user network 2, like a LAN (Local Area Network), is connected to the access network 4 through a user node equipment 3.

The network at the telecommunications carrier side is constructed by mutually connecting regional networks 7 installed in respective areas obtained by dividing a core network 8. Each of the regional networks includes a core node equipment 6, and the core node equipments 6 constituting the respective regional networks 7 are mutually connected between the regional networks 7. For example, a core node equipment 6c and a core node equipment 6d are mutually connected between a regional network 7a and a regional network 7b. The regional network 7 and the access network 4 are mutually connected by the core node equipment 6 and an edge node equipment 5. The relation between the core node equipment and the edge node equipment is not limited to one to one relation, and one core node equipment (for example, 6a) may be mutually connected to plural edge node equipments (for example, 5a and 5b). Similarly, the edge node equipment (for example, 5a) contains plural user locations (for example, 30 and 31) through an access network 4a. Since the network is constructed by the tree structure as stated above, traffics from plural user locations are naturally concentrated at an upstream apparatus.

In this embodiment, in the service to provide the telecommunications infrastructure connecting company locations, setting on telecommunication lines used by the company user can be changed by the user freely and in real time. Especially, the setting change is enabled to be provided in which even if plural users perform the setting change simultaneously, inconsistency and unconformity do not occur in the telecommunications carrier network, and standby times of the users are reduced.

The network structure to provide such a setting change function is such that the core network 8 and a management network 9 are connected through a core node equipment 6e and an edge node equipment 5d, and a network resource controller (server apparatus) 10 is provided in the management network 9.

When performing the setting change by using this service, the network administrator of the user company issues a request from a terminal 1 in its own network (user network 2) to the network resource controller 10. The terminal 1 includes, for example, an input unit to input setting information of an IP-VPN (logical line) between locations (user networks) and a transmission unit to transmit the setting information to the network resource controller 10.

Figure 9:
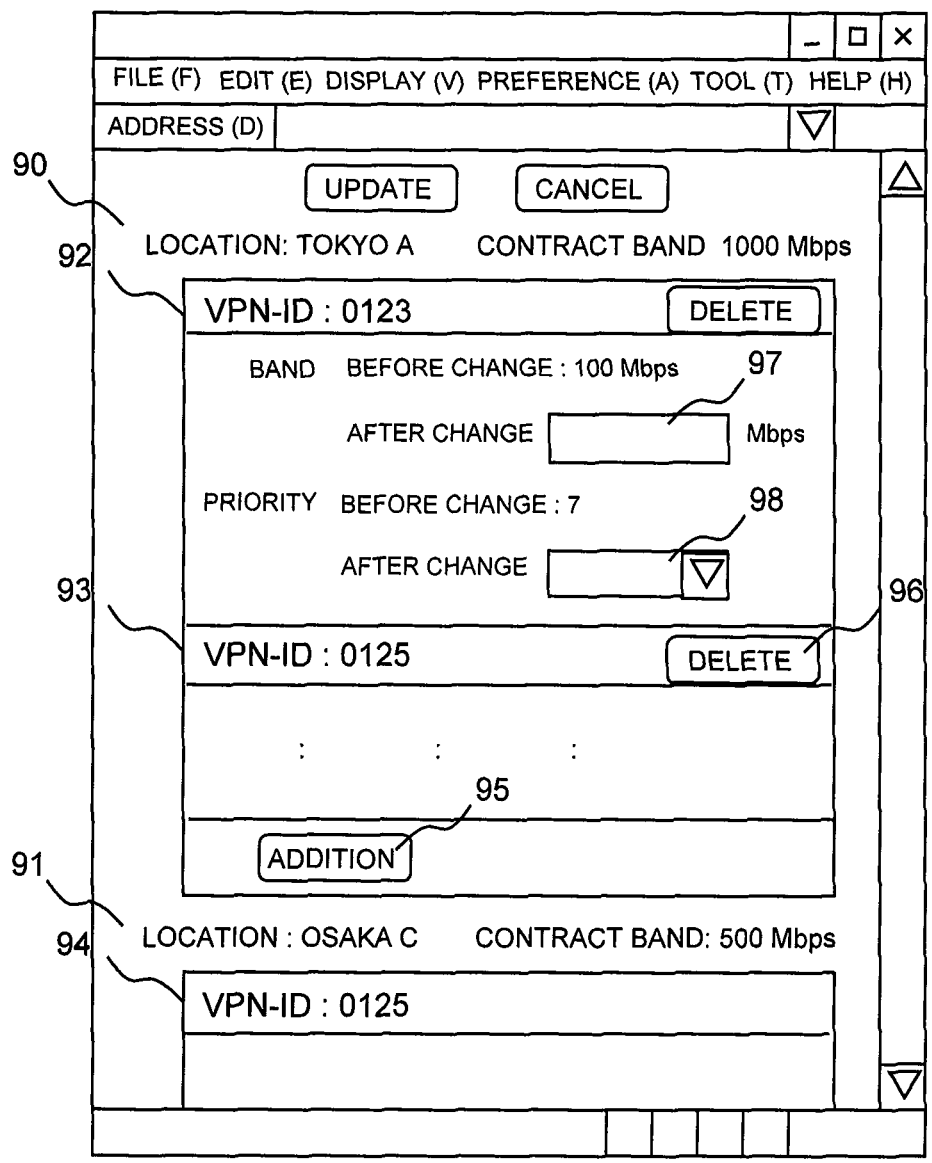
FIG. 9 is a view showing an example of a setting screen for a user request.

The telecommunications system between the user terminal 1 and the network resource controller 10 at this time may be realized by a unique client application and a unique telecommunications system, or may be realized by a telecommunications system using an input form from a browser screen as later shown in FIG. 9 and HTTP/HTTPS. When the input form from the browser screen as shown in FIG. 9 is adopted, a Web server is also required in the management network 9. However, since a general-purpose Web server/technique has only to be used, it is omitted in FIG. 1. Incidentally, FIG. 9 will be described later in detail.

The matter caused when plural users simultaneously perform setting changes will be again supplementarily described with reference to FIG. 1. A point influenced by the setting changes from plural users is, for example, a line on which traffics from plural user locations are concentrated and are carried together. At an end of the tree structure network, although traffics of plural users are collected in an equipment, since a port/logic interface is for each user, the state of carrying together of traffics does not occur. However, in an upstream core node equipment, it is impossible to allocate the resource to the individual traffics of all users, the traffics are inevitably carried on the same line. In general, although a more upstream network is configured to have a thicker line band, all lines are not uniform. For example, between the regional network 1 (7a) and the regional network 2 (7b), or between the core node equipment 6c and the core node equipment 6d, there is a case where the line becomes thinner than the line of the other core network/regional network. In such a line, a setting change performed by a certain user influences the traffic of another user.

As an example, it is assumed that locations 30, 31 and 32 of FIG. 1 are locations of the same company. In each location, a user NW is provided. When the network administrator of the user company changes the VPN line first provided between the locations 30 and 31 so that the VPN line is provided between the locations 30 and 32, a new traffic is applied by the setting change to the line connecting the regional network 1 (7a) and the regional network 2 (7b).

With respect to the above point, it is necessary to judge admission or non-admission of the setting request. There is also a possibility that plural users simultaneously perform similar setting changes. At that time, there is an approach in which processing is performed sequentially in order of arrival of the request. However, a user receiving a low priority may complain about the standby time. The matter of the approach of sequentially performing the process will be described with reference to FIG. 2.

Figure 2:
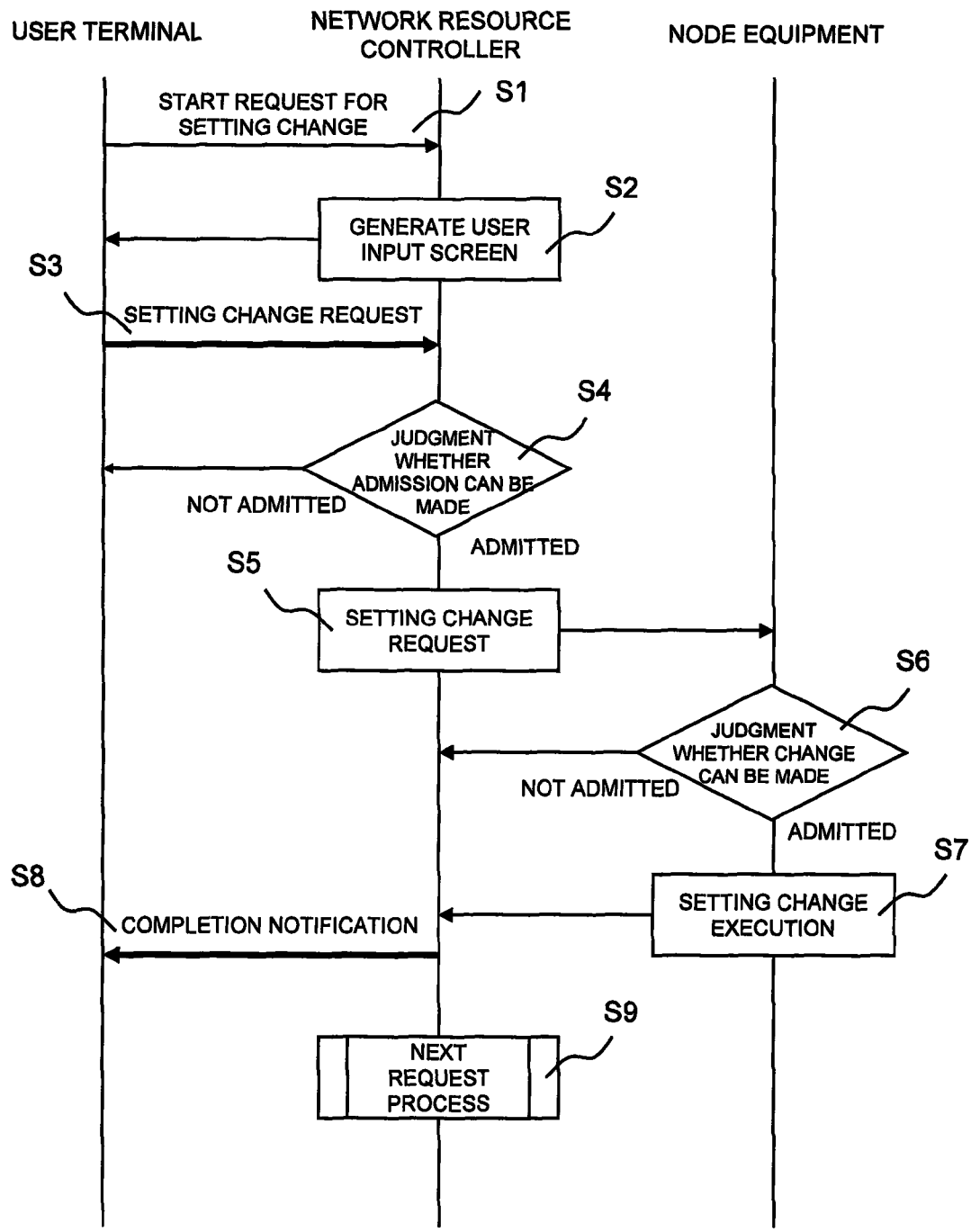
FIG. 2 is a flowchart for explaining a matter in a case where plural requests are sequentially processed.

FIG. 2 is a sequence view for explaining the matter of the case where plural requests are sequentially processed.

The words "user terminal" in the drawing denote a terminal in a user network operated by a network administrator of a company using this service, and issues a change request on a service. First, a login is performed to a system for inputting change content (S1). Although omitted in the drawing, authentication, confirmation and the like are performed at this step.

The request from the user is processed by the network resource controller 10. When the user logs in the system, a user input screen is generated and is presented (S2).

FIG. 9 shows an example of the user input screen.

Information of a location and a contract band as contract information is presented, for example, for each location (90, 91). Besides, information already set by a user is also classified, for example, in units of locations and is presented (92, 93, 94).

FIG. 16 is a structural view of a contract information table. FIG. 17 is a structural view of a setting information table. The contract information and the setting information can be respectively obtained from, for example, a database (contract information DB, FIG. 16) for managing the contract information table and a database (setting information DB, FIG. 17) for managing the setting information table. The contract information table stores, for example, a user identifier, a location identifier and a contract band, which are correlated with one another. The setting information table stores a user identifier, a location identifier, a VPN-ID, band information and priority information, which are correlated with one another. The information is read from the respective tables, and is used for generation of the user input screen of FIG. 9.

Figure 3:
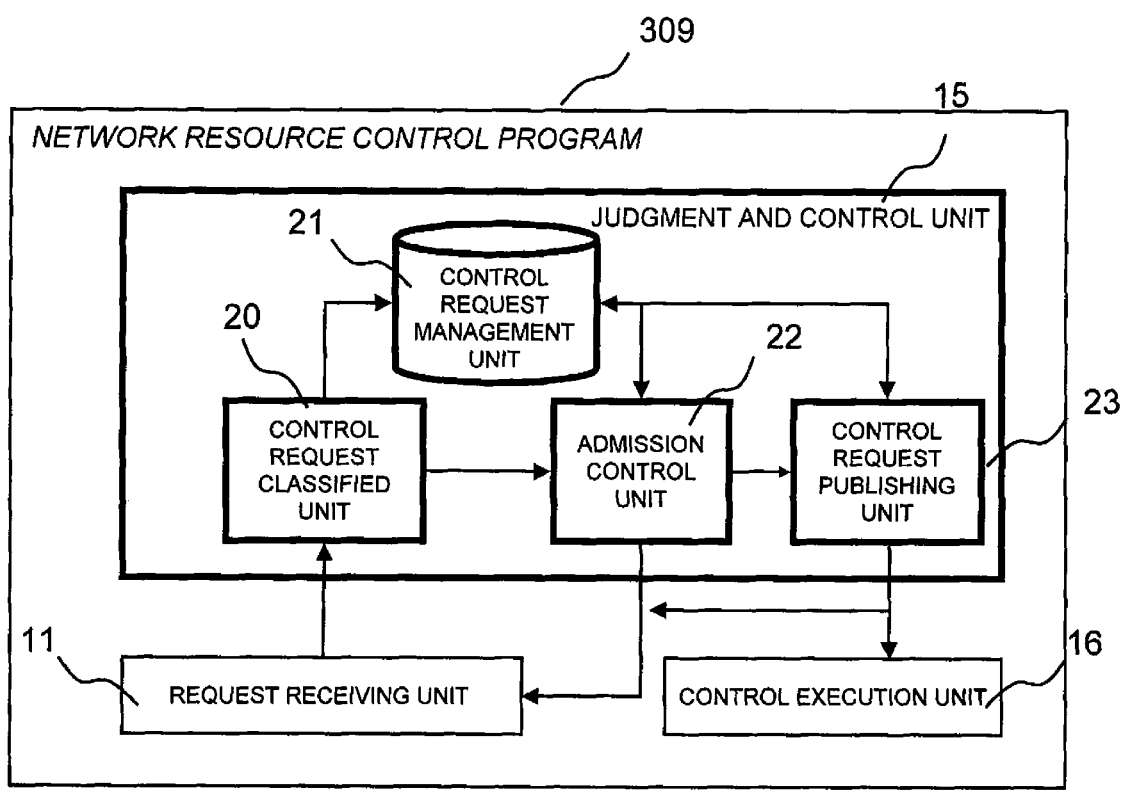
FIG. 3 is a functional block diagram of a network resource control program.

FIG. 3 described later shows a function block diagram of the network resource controller 10. Since a general technique may be used for the procedure up to here, the procedure is omitted in the function block diagram. The contract information DB and the setting information DB may be respectively mounted in a controller different from the network resource controller 10. In that case, the controller is installed in the management network 9 similarly to the network resource controller 10.

After referencing the current information, the user inputs (97) or selects (98) the new information. When the existing setting itself is deleted, a delete button 96 relevant to the setting is used. When setting is newly added, an addition button 95 is used. When the addition button is depressed, input of a VLAN-ID to be added is urged by a dialog box or the like, and then, the input screen as exemplified by 92 is generated and is presented. However, at the time of addition, there is no setting information before the change. When the total value of band information inputted by the addition or the change exceeds the total band (contract band) of the locations, an alarm is issued to the user at the time of the input. That is, control is performed such that even if a renewal button is depressed, the change request is not transmitted to the resource control server 10, and error notification of the input content is performed.

Although FIG. 9 shows an example of the user input screen in which the setting formation of each location is collected, the setting information sorted in VLAN-ID units may be presented. Besides, not a user input method of graphical user interface (GUI) base as in FIG. 9, but a user input method of command-line user interface (CUI) base is provided, and the operationality similar to the setting change to the user node equipment 3 may be provided.

Return is made to the description of FIG. 2. The user terminal inputs the information of the setting change from the input unit, such as a keyboard or a mouse, by using the screen as shown in FIG. 9, and issues the request when the renewal button is depressed (S3). The network resource controller receiving the setting change request S3 judges admission or non-admission of the setting change request (S4). When the request can not be admitted, a reply is made to that effect, and when the request can be admitted, the setting change request is issued to the relevant node equipment (S5). The node equipment receiving the setting change request S5 judges whether the change can be performed or not (S6), and performs the setting change (S7). The network resource controller receiving the response to the request from the node equipment notifies the user terminal of the result (S8), and shifts to a next request process (S9).

When the process to the setting change request is performed as stated above, immediately after receiving the request S3 from a certain user, when a request from another user issued almost at the same timing is received, the request stored behind in the order of a processing queue is not processed until the process of the previously stored request is ended. In the above example, the period from S3 to S8 becomes the standby time. When the admission judgment process of the change request and the setting change process to the node equipment are independently performed, the admission judgment of the next stored request can be quickly performed after the admission judgment process of the previously stored request is ended. However, the setting is finally reflected and becomes usable after the setting change to the node equipment is completed. Thus, although the time required before the admission judgment result is shortened, there is a matter that the required time for waiting until the setting is reflected and become usable is not improved.

In this embodiment, the resource control process is realized in which even when plural requests are concentrated as stated above, the standby time to the user is reduced. In this embodiment, when the network resource control system judges admission or non-admission of the user request, reference is made to actual resource information which is set and reflected in the node equipment, and further, the request contents previously stored in the queue to manage duplicate user requests are consider and the admission judgment is performed. The admission judgment is performed before the request previously stored in the queue is set and reflected in the actual node equipment, and the standby time of the judgment to the user request is shortened. Besides, in this embodiment, when the network control system updates the setting of the node equipment, plural request contents approved by the admission judgment of the user requests are collectively ordered, and even when plural users simultaneously issue setting change requests on the same node equipment, the load of the setting change requests of the node equipment is reduced.

Figure 18:
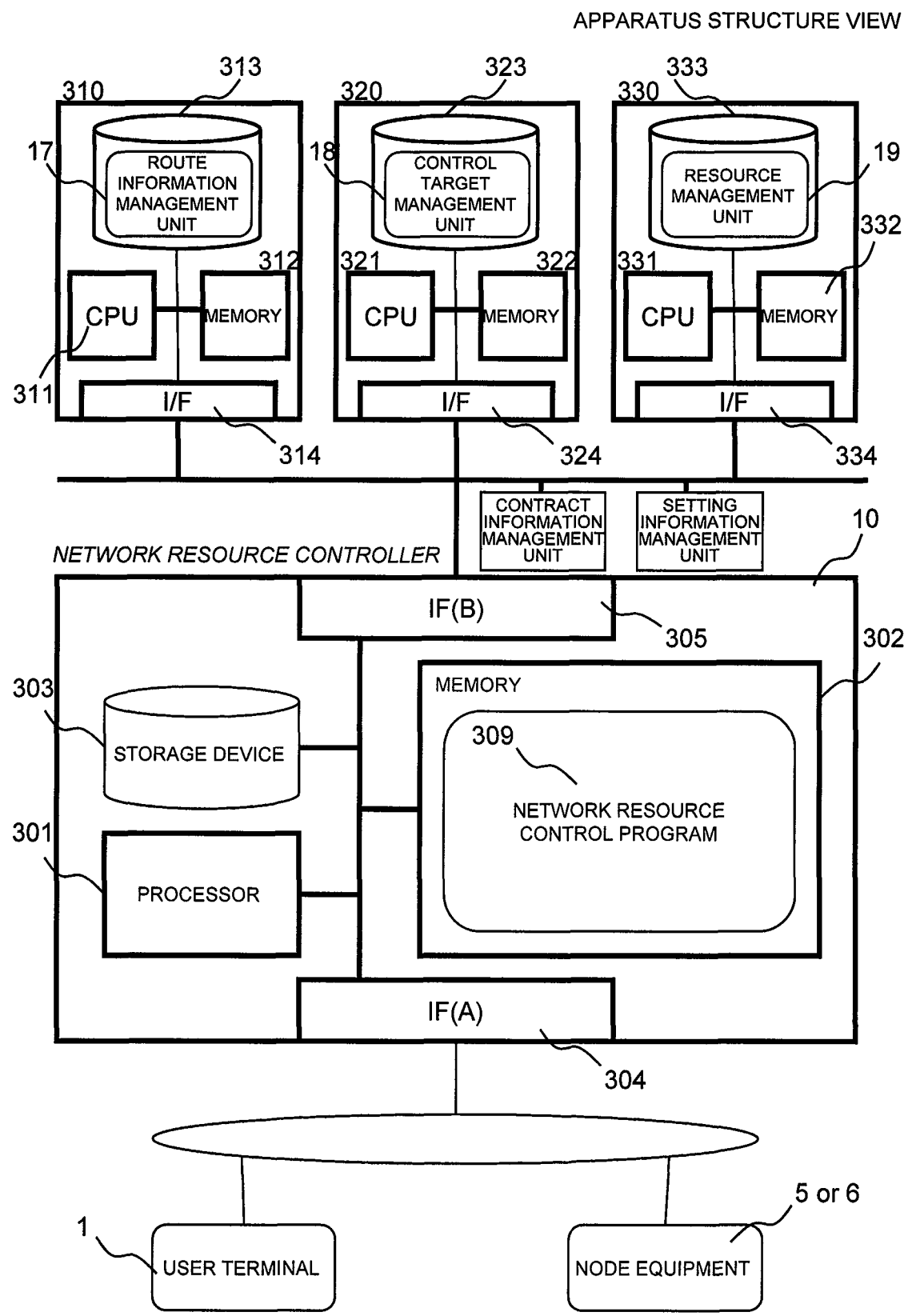
FIG. 18 is a view of a structure of a network resource controller of an embodiment.

FIG. 18 is a structural view of the network resource controller 10 of this embodiment.

The network resource controller 10 of the embodiment includes a processor 301, a memory 302, a storage device 303 and network interfaces (304 and 305). For example, a network resource control program 309 is installed in a general-purpose server apparatus. The network resource control program 309 is stored in the storage device 303, is loaded on the memory 302 at the time of execution of the program, and is driven by the processor 301.

A route information management unit 17 is similar to that managed by a general network management system, and route information set in the respective node equipments is collected. As shown in FIG. 18, the route information management unit 17 is table information managed by a general-purpose database apparatus 310 including a CPU 311, a memory 312, a storage device 313, and a network interface 314.

FIG. 15 shows an example of a structure of a route information management table.

The route information management table stores a VPN-ID 150, a transmission source 152, a transmission destination 154, and a route information 156. The route information 156 stores, for example, an identifier of a node equipment and an identifier of an interface on a route specified by the VPN-ID 150, or on a route specified by the transmission source 152 and the transmission destination 154.

On the other hand, a control target management unit 18 registers and manages a node equipment and an interface, which includes a point (line) where setting change of a user influences a traffic of another user. As shown in FIG. 18, the control target management unit 18 is table information managed by a general-purpose database apparatus 320 including a CPU 321, a memory 322, a storage device 323, and a network interface 324. The administrator (administrator of the telecommunications carrier network) of the network previously registers the node equipments (for example, 6c and 6d) of a point (between 6c and 6d in FIG. 1) where the line band is thin, and the target interface (FIG. 13).

A structure of a resource management unit 19 may be the same as that used in a related art network management system or a node management system. As shown in FIG. 18, the resource management unit 19 is table information managed by a general-purpose database apparatus 330 including a CPU 331, a memory 332, a storage device 333, and a network interface 334. The setting of a limit value may be managed by a value equal to the band of a physical line, or may be managed by adding a value of an allowable width set by the configuration of the system to the band of the physical line (FIG. 14).

FIG. 14 shows an example of a structure of a resource management table. The resource management table stores a node identifier 140, an interface identifier 142, an upper limit band 144, and a reservation band 146, which are correlated with one another.

In FIG. 18, although the database apparatus 310 storing the route information management unit 17, the database apparatus 320 storing the control target management unit 18, and the database apparatus 330 storing the resource management unit 19 are shown to be constructed of different apparatuses, these pieces of information may be managed by the same database apparatus.

FIG. 3 is a function block diagram of the network resource control program 309.

The network resource control program 309 includes, for example, a request receiving unit 11, a judgment and control unit 15, and a control execution unit 16. The judgment and control unit 15 includes a control request classified unit 20, a control request management unit 21, an admission control unit 22 and a control request publishing unit 23.

FIG. 3 shows only the function block relating to the process after the setting change request (S3) is received.

In the network resource controller 10, the request receiving unit 11 receives the change request (user request, setting change request, setting information) from the user terminal (terminal in the user network 2) 1. The request received here includes a set of contents inputted through the user setting screen as shown in FIG. 9. That is, when the change contents include plural locations and plural settings (for example, setting of 92, setting of 93 and setting of 94), one request message includes plural setting change items. On the contrary, when the change content is a single setting of a single location, one request message includes one setting change item.

The control request classified unit 20 checks node equipments and interfaces, which are control targets, for each of setting change items, and classifies the requests to the respective control targets. The classified result is temporarily recorded in the control request management unit 21 until the control is completed.

FIG. 4 shows an example of a table structure of the control request management unit 21.

Change content 41 is classified for each target node equipment and each target interface (40). At this time, the target node equipment and the target interface are specified by referring to the route information management unit 17 and the control target management unit 18.

Figure 10:
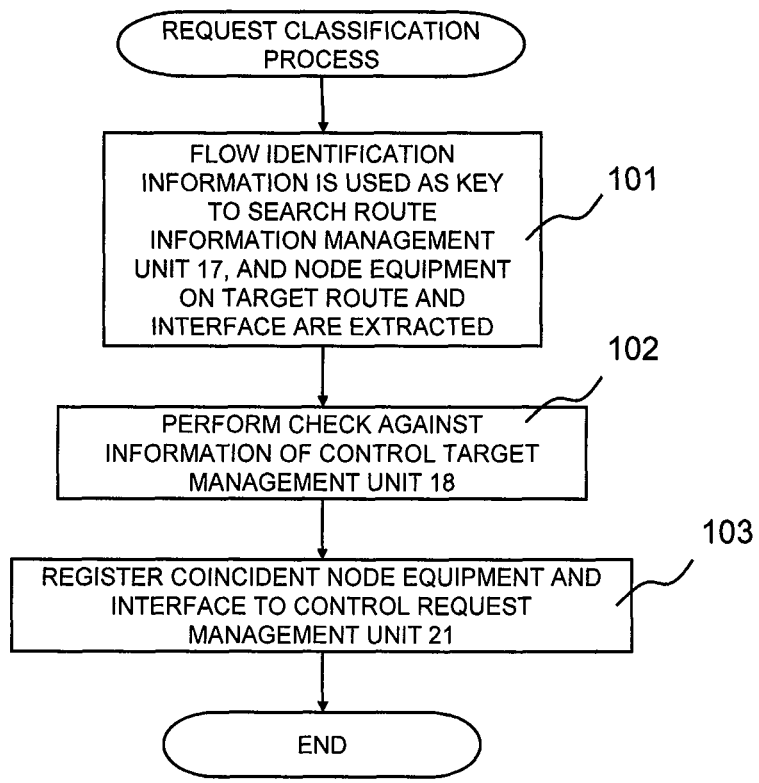
FIG. 10 is a flowchart showing a processing procedure of a request classification process.

As a processing procedure performed by the control request classified unit 20, the route information management unit 17 is checked while the flow identification information (for example, VPN-ID, transmission source address, transmission destination address, etc.) included in the change content is used as a retrieval key, and the node equipment and the interface on the target route are extracted (FIG. 10, step 101). Next, it is confirmed whether the extracted node equipment and the interface are registered in the control target management unit 18 (FIG. 10, step 102). As a result of checking with the information of the control target management unit 18, when they are coincident, this is made the change content relating to the coincident node equipment interface and is registered in the control request management unit 21 (FIG. 10, step 103). Since the edge node equipment 5 included in the target route becomes a direct target of the setting change as the equipment at the boundary point of the telecommunications carrier network, all are extracted to the control request management unit 21. When the information of equipments and interfaces relating to the edge node equipments is registered in the control target management unit 18, the control requests can be classified in the management unit 21 by the flow of the procedure.

Subsequently, remaining elements shown in FIG. 4 will be described. A difference column (diff) 42 is a column for registering, when there is a change in the request band, a difference between the band before the change and the band after the change. Although it may be calculated when the later processing of the admission control unit 22 is performed, when it is performed as the processing of the control request classified unit 20 in the flow of registering information in the change content column 41, there is no waste in reading of data or the like.

A request ID column (Req-Id) 43 is for registering an identifier which is uniquely set by the system to each change request. When registration is made in the control request management unit 21, the setting is performed so that the overlapping with another change request does not occur. However, the same request ID is given to change requests which are derived from the same change request and are different in the target node equipment and interface.

A state column (Status) 44 is a column for managing a processing state of a change request. The control request classified unit 20 separates the respective change requests by each target node equipment and each target interface, and when the change request is registered in the control request management unit 21, the state of "NON" occurs. Hereinafter, as a result of the admission judgment of the change request performed by the admission control unit 22, when the admission is possible, the registration content is changed to "OK", and when the admission is impossible, it is changed to "NG". When all results of admission judgment to the same request ID are "OK", after the control request publishing unit 23 performs the setting change to the node equipment, they are deleted from the control request management table. On the other hand, with respect to the change requests of the request ID in which at least one becomes "NG", since the request content can not be admitted, a reply to that effect is sent to the user through the request receiving unit 11.

Although the description is partially made in FIG. 4, a return is made to FIG. 3 and the description will be continued. After the control request classified unit 20 performs classification and registration to the control request management unit 21, the admission control unit 22 performs admission judgment of a control request newly registered in the control request management unit 21. The target at this time is such that the state column 44 is "NON" in the item of the control request management table shown in FIG. 4.

As a characteristic judgment procedure of this system, each control request is not singly judged, but control requests to the same target node or the same target interface are collectively judged. For example, FIG. 4 shows a state where the judgment results are produced, and like the entries #1 and #2 or #10 and #11, when the processing states of the control requests for the same target node or the same target interface are "NON", the entries #1 and #2 or #10 and #11 are collectively judged. Specifically, it is judged whether all of the plural control requests to the same target can be applied. In the case of the entries #1 and #2, although the respective change requests are a band increase of 7 M and a band decrease of 2 M, the influence on the control target is a band increase of 5 M. Thus, the judgment is performed from the viewpoint that the band increase of 5 M is possible in the control target node equipment or the interface on the route. Also in the case of the entries #10 and #11, similarly, the judgment is performed from the viewpoint that the band increase of 15 M is possible in the control target. Although there can be a case where the collected request contents are not admitted, at that time, it is possible to use a method in which later stored requests are sequentially removed and the judgment is again performed. Besides, like a binary search often used in a search process, a method can be used in which a primary judgment is performed for the contents of a half number of requests, and when the judgment result indicates Yes, the contents of a half number of the remaining requests are added and the judgment is performed, and when the judgment result indicates No, the judgment is performed for the contents of a fourth number of requests, and such judgment is repeated to obtain a permissible boundary point. With respect to the entries #10 and #11 of FIG. 4, the case is exemplified in which although the requests up to the entry #10 are admitted, the request of the entry #11 is not admitted. With respect to the request in which the judgment result indicates No, the result is notified to the terminal 1. Besides, also with respect to the request in which the judgment result indicates Yes, similarly, the result at the time when the admission judgment result is produced may be notified.

When the judgment as stated above is performed, the information of the existing resource use state and the limit value of the control target is acquired from the resource management unit 19.

When the judgment result is obtained through the procedure as stated above, a processing of the control request publishing unit 23 is next performed. The control request publishing unit 23 generates a request to a control target, and executes control through the control execution unit 16. Although the target is the control request in which the result of the admission judgment is "OK", here, the control is not performed for each of requests, but the control is performed for the request contents collected for each of control targets. For example, with respect to requests to the same node like the entries #1 and #2 of FIG. 4, setting change messages (control requests) are collected into one and the control is performed. As the control content, for example, shaping setting in VPN/label/flow units is performed. Although the interface specification of the control request depend on the interface included in the node equipment, a method may be adopted in which login is performed to a target node by telnet or the like and a control command is issued, or NETCONF Configuration Protocol (RFC 4741) developed by the Internet Engineering Task Force (IETF) may be used. At this time, whether plural control requests to the same node/same interface can be performed by one control command/one control message to the node equipment depends on the interface specification of the target node. Incidentally, the process "control is performed for the request contents collected for each of control targets" is the process of the control request publishing unit 23 of the network resource controller 10.

Finally, when the control to the node equipment as the target is completed, the result is reflected in the resource control unit 19, and is notified also to the user terminal.

Up to here, the flow of the series of processes of the network resource controller 10 shown in FIG. 3 is described. FIG. 3 shows the configuration in which all of the control request classified unit 20, the admission control unit 22, and the control request publishing unit 23 are mounted on one apparatus. However, a system configuration may be adopted in which an apparatus in which the request receiving unit 11 and the control request classified unit 20 are mounted, an apparatus in which the admission control unit 22 is mounted, and an apparatus in which the control request publishing unit 23 and the control execution unit 16 are mounted are provided, and the respective apparatuses operate while communicating with the apparatus in which the control request management unit 21 is mounted.

Besides, FIG. 4 shows an example of the table structure in which a focus is given to the control request management caused by the setting change of the bandwidth. When it is necessary to check a variation in band allocation for each priority caused by the setting change of the priority, the priority is added to the classification item in addition to the target node equipment and the interface. That is, the condition of the priority is added to the item 40 of FIG. 4, and the classification and arrangement are performed. Similarly, also in the resource management table shown in FIG. 14, the condition of priority is added, and the classification and arrangement are performed (for example, a column is added between 142 and 144 and the classification is performed).

Next, the processing procedure of the network resource controller 10 described in FIG. 3 will be further described with reference to a flowchart.

Figure 5:
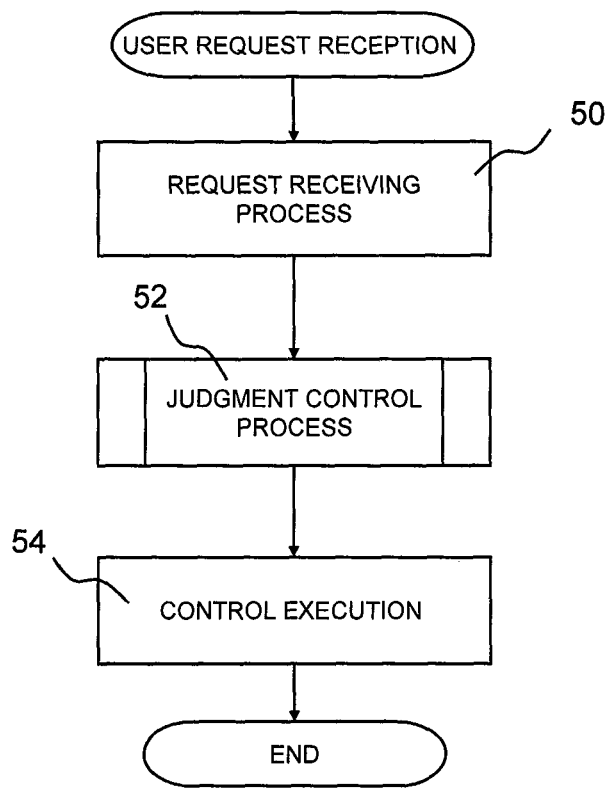
FIG. 5 is a flowchart showing a processing procedure of a network resource controller at the time of user request reception.

FIG. 5 is a flowchart showing the processing procedure of the network resource controller at the time of user request reception.

As the total flow, as already described in FIG. 3, a request receiving process 50 to receive a user request by the request receiving unit 11 is performed, and next, a judgment control process 52 performed by the judgment and control unit 15 is performed. The judgment control process 52 will be described later in detail with reference to FIG. 6. When the judgment control process 52 is performed, the control execution unit 16 performs a control 54 to a node equipment.

Figure 6:
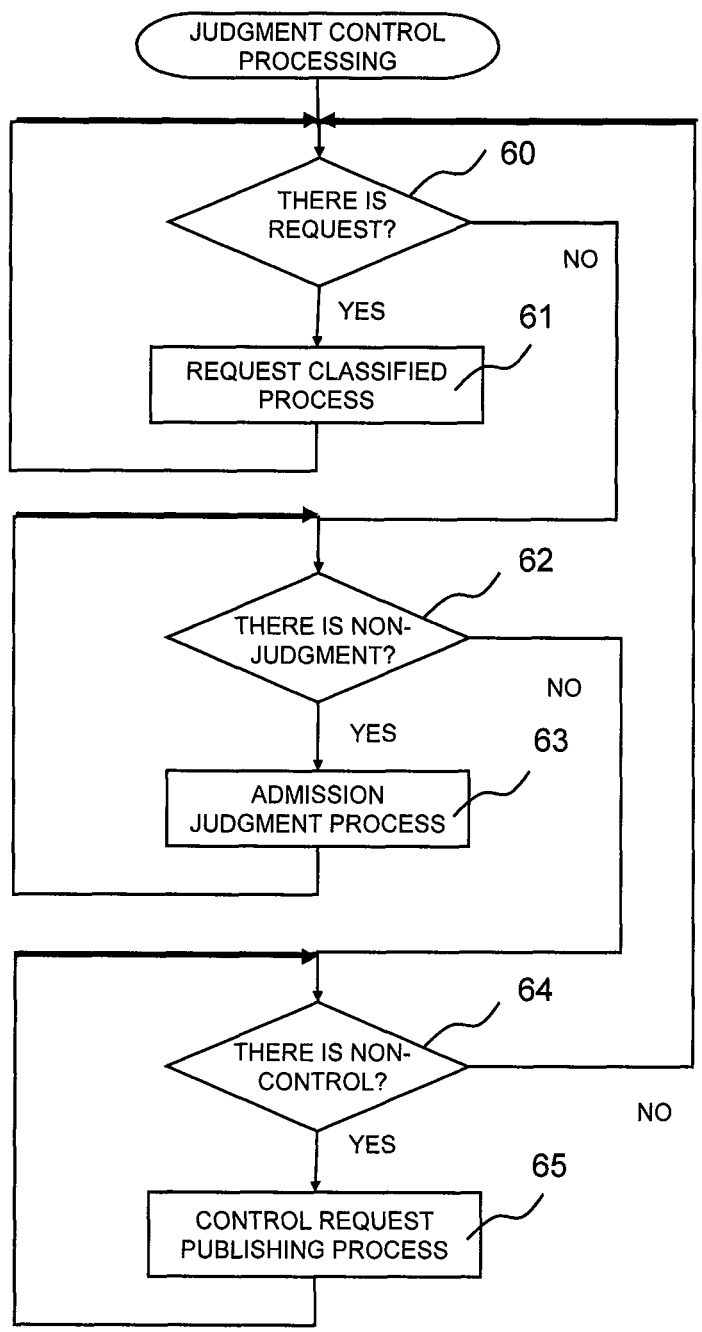
FIG. 6 is a flowchart showing a processing procedure of a judgment and control unit.

FIG. 6 is a flowchart showing the judgment control process of the judgment and control unit 15.

A request classification process 61 corresponds to a process of the control request classified unit 20, and an admission judgment process 63 corresponds to a process of the admission control unit 22. Besides, a control request publishing process 65 corresponds to a process of the control request publishing unit 23. As described in FIG. 3, the basic flow is a form in which the request classification process 61, the admission judgment process 63, and the control request publishing process 65 are sequentially performed. Here, with respect to the timing of transition between processes, a more detailed description will be made. In any process, a transition to a next process is caused after all unprocessed contents are processed. In the request classification process 61, the process is performed until an unprocessed request disappears, and at the time point when the unprocessed request disappears, a transition occurs to a next admission judgment process (step 60). In the admission judgment process 63, when there is no unjudged process, a transition occurs to a next control request publishing process. When there are unjudged processes (step 62), all the admission judgment processes are performed (step 63). Similarly, in the control request publishing process 65, when there is no uncontrolled process, a transition again occurs to the request classification process. When there are uncontrolled processes (step 64), all the control request publishing processes are performed (step 65).

Figure 7:
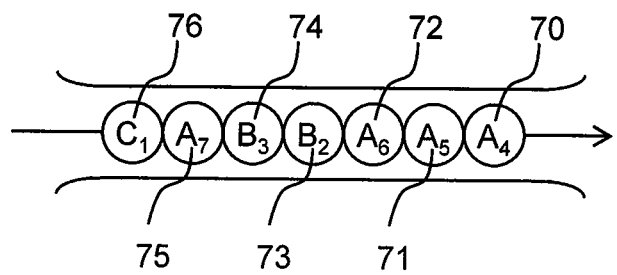
FIG. 7 is a view showing an example of a structure of a processing queue in the judgment and control unit.
Figure 8:
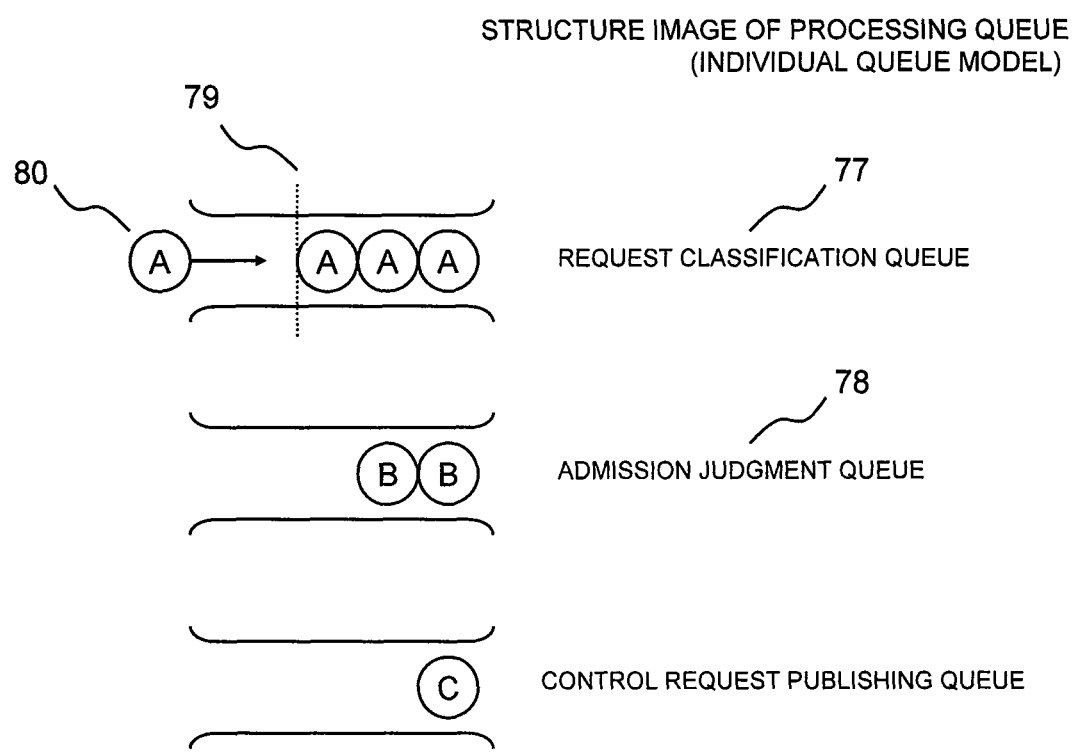
FIG. 8 is a view showing an example of another structure of the processing queue in the judgment and control unit.

As a realizing system of an unprocessed queue, a system as in FIG. 7 or a system as in FIG. 8 is conceivable. Next, the flow of FIG. 6 will be described in accordance with the structure of each processing queue.

First, a case in which a structure of a processing queue as in FIG. 7 is adopted will be described.

This model is a system in which a unified queue independent of processes is provided, and each process is stored in the queue when it occurs. When the respective processes are stored in the form like an example shown in FIG. 7, until process $A_6$ of 72 is ended, it is judged to be "Yes" in the unprocessed request confirmation of step 60, the request classification process 61 is repeatedly performed. When the classification of requests is ended, the respective processes $A_4$ to $A_6$ become new admission judgment waiting processes $B_4$ to $B_6$, and these are sequentially stored after 76. When the turn comes to process $B_2$ of 73, it does not meet the unprocessed request confirmation of step 60 and is judged to be "No", while it is judged to be "Yes" at the unprocessed judgment confirmation of step 62. Thus, the admission judgment process 63 is performed. Until process $B_3$ of 74 is ended, it is judged to be "Yes" at the unprocessed judgment confirmation of step 62, and accordingly, the admission judgment process 63 is repeatedly performed. Since next process $A_7$ of 75 does not meet the unprocessed control confirmation of step 64, return is made to step 60, and the request classification process of step 61 is performed. Since next process $C_1$ of 76 does not meet step 60 or step 62, and a flow becomes such that a transition occurs to step 64 and the control request publishing process of step 65 is performed. Incidentally, the admission judgment process and the control request publishing process can be collectively processed in addition to the repeated process of $B_2$ and $B_3$.

As described above, in the model of FIG. 7, the process is performed in order of storage in the unified queue, and when the same process is continuous, the process is continued. By performing the process as stated above, for example, the processes 71 to 72 are placed in a request judgment waiting state after the request classification process is ended, and are again stored in the unified queue in the same way. Thus, requests generated continuously at the same timing are processed at almost the same period. Incidentally, although the unit of the process stored in the queue is the request ID 43, the unit of the process performed when the turn comes is the unit of the control target node equipment and the control target interface in the admission judgment process 63 and the control request publishing process 65. Thus, there is a possibility that processes whose control targets are the same are processed at once before the process turn of the queue comes.

Next, a case of adopting a structure of a processing queue as in FIG. 8 will be described.

The model is a system in which a queue is prepared for each process, and is suitable for a case where the request classification process 61, the admission judgment process 63, and the control request publishing process 65 are operated in parallel by plural CPUs. Strictly, since the control request management table 21 is shared, each process is time-divided by exclusive control. However, this model is suitable as a form in which when an allocated time (order) 79 between processes occurs, the same kind of stored processes are performed at once. For example, a process stored in each queue is performed at each previously determined timing 79. Besides, when a previously determined amount of processes are stored in the queue, the processes may be collectively performed.

The request classification process 61, the admission judgment process 63, and the control request publishing process 65 will be supplementarily described with reference to flowcharts.

FIG. 10 shows a flowchart of the request classification process 61. Since the request classification process is described as the process procedure performed by the control request classified unit 20 in the description of FIG. 4 while reference is made to the reference numerals of FIG. 10, its description will be omitted.

Figure 11:
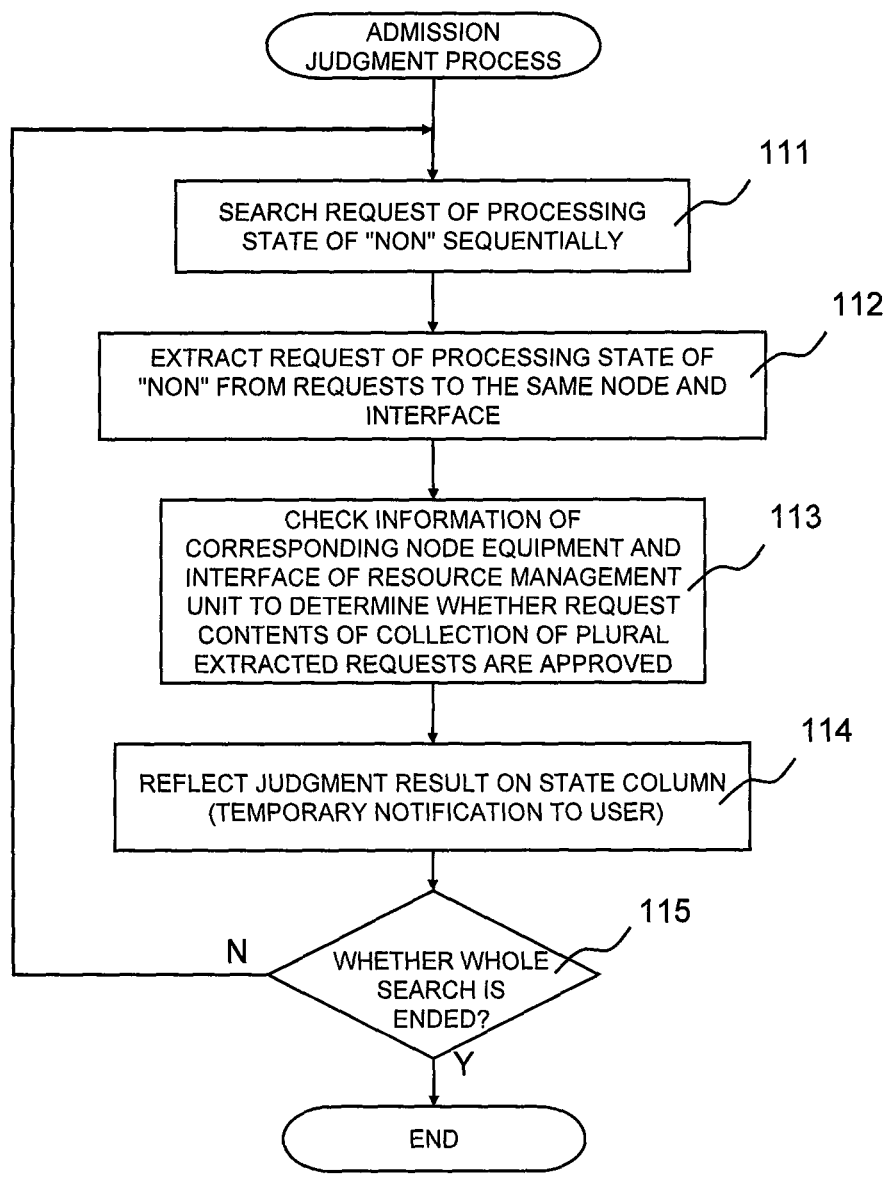
FIG. 11 is a flowchart showing a processing procedure of an admission judgment process.

FIG. 11 shows a flowchart of the admission judgment process 63.

Although the admission judgment process is described as the process of the admission control unit 22 in the description of the latter half of FIG. 3, here, a description will be made in accordance with the procedure of the flowchart. In the admission judgment process, the process is performed for an target of a request in which the state column 44 of the control request management table is "NON" (request in which the process state is "NON") (step 111). When the request in which the processing state is "NON" is extracted, it is extracted in units of the same node equipment and interface (step 112). Since the requests of the control request management table are classified (40) for each target node equipment and each target interface, a search has only to be sequentially performed. When unprocessed requests for the same node equipment and the interface are extracted collectively, the information of the corresponding node equipment and the interface of the resource management unit 19 is checked to determine whether the request contents in which the plural extracted requests are collected are approved (step 113). The approval judgment of the collected request contents is described in the description of the admission control unit 22 of the latter half of FIG. 3, it is omitted. The judgment result is reflected in the state column 44 (step 114), and a shift is made to the judgment of the request to the next node equipment and interface (step 115). Here, the judgment result, together with the reflection in the state column 44, may be notified to the user terminal.

In the network control system of this embodiment, when it is judged whether the user request can be admitted or not, reference is made to the actual resource information which is set and reflected in the node equipment, and further, the request contents previously stored in the queue to manage the duplicate user requests are considered, and the admission judgment is performed. Thus, there is a merit that the admission judgment can be performed before the request previously stored in the queue is set and reflected in the actual node equipment, and the standby time of the judgment to the user request can be shortened.

Figure 12:
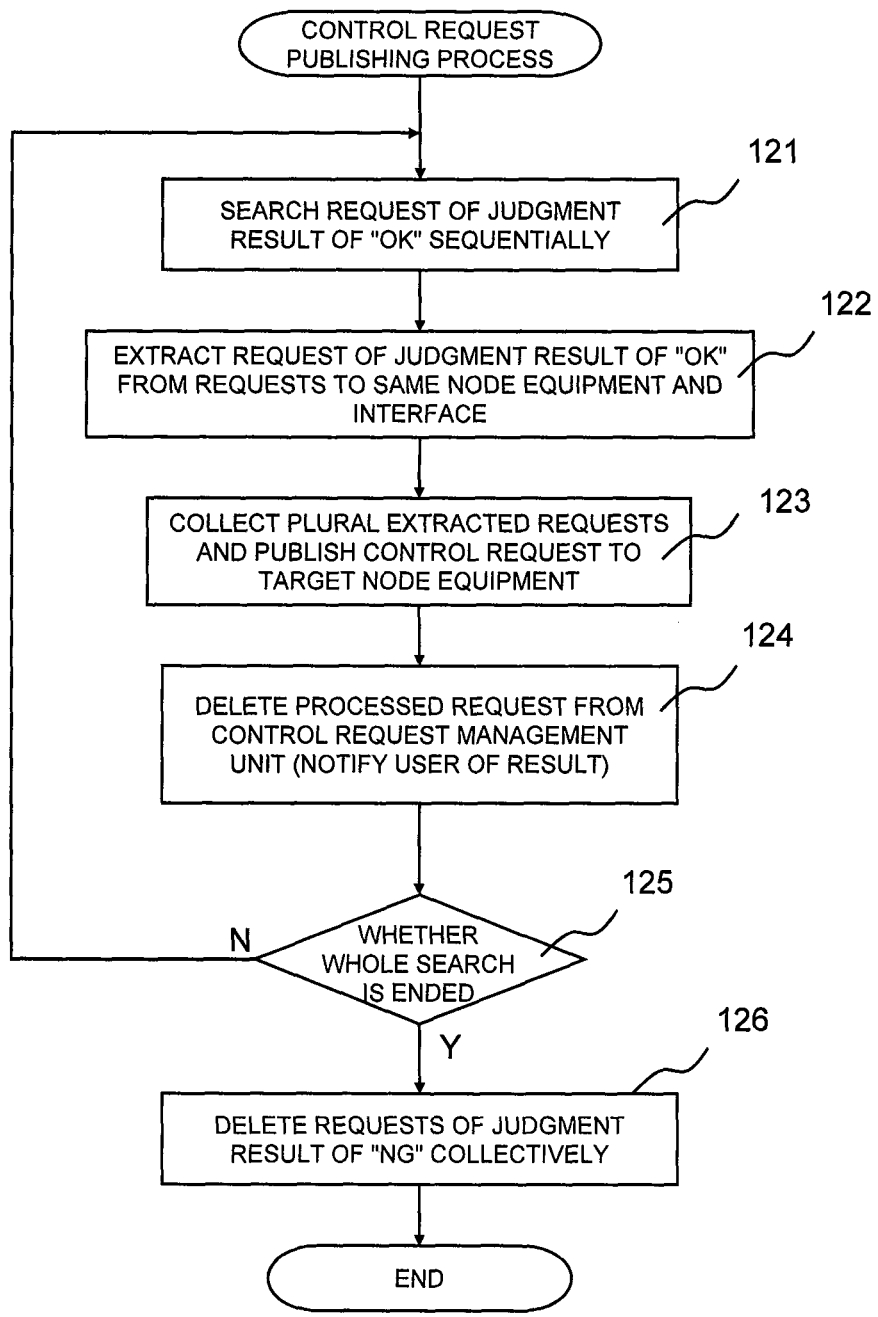
FIG. 12 is a flowchart showing a processing procedure of a control request publishing process.

FIG. 12 shows a flowchart of the control request publishing process 65.

Although the control request publishing process is also described as the process of the control request publishing unit 23 in the description of the latter half of FIG. 3, here, a description will be made in accordance with the procedure of the flowchart. In the control request publishing process, the process is performed for the request in which the state column 44 of the control request management table is "OK" (step 121). Similarly to the admission judgment process, here, the extraction is performed in units of the same node equipment and interface (step 122). When requests to the same node equipment and interface are extracted, the request contents are collected, and a control request to the target node equipment is issued (step 123). The processed request in which the control request is delivered to the control execution unit 16 is deleted from the control request management table (step 124). Here, the processing state may be again notified to the user terminal. When the processes to all node equipments and interfaces where the state column 44 of the control request management table is "OK" are completed (step 125), the requests in which the judgment result recited in the state column 44 is "NG" are collectively deleted (step 126). However, with respect to the timing when the requests in which the judgment result is "NG" are deleted, the deletion may be performed at the last of the admission judgment process, or may be performed at the first of the control request publishing process.

In the network control system of this embodiment, when the setting update to the node equipment is performed, the plural request contents approved at the admission judgment of the user request are collectively ordered. Thus, even when plural users simultaneously issue the setting change requests relating to the node equipment, the load of the setting change requests to the node equipment can be reduced.

Up to here, this embodiment is described as countermeasures against the case where plural users simultaneously perform setting changes. Hereinafter, it will be described that the structure of the embodiment can be applied and effective even for the case where a single user managing plural connection locations changes plural settings.

It is assumed that the locations 30, 31 and 32 of FIG. 1 are locations of the same company. For example, it is assumed that first, a VPN line is provided only between the location 30 and the location 32, and then, an attempt is made to newly provide another VPN line between the location 31 and the location 32. Besides, it is assumed that an attempt is made to simultaneously increase the band of the VPN line between the location 30 and the location 32.

At this time, with respect to the locations 30 and 31 of the transmission side, although the respective change requests may fall within the contract band, whether this request can be admitted or not is judged after the state at the location 32 side is taken into consideration. At the location 32, different VPN traffics from the location 30 and the location 31 converge. When the total traffic amount significantly exceeds the contract band of the location 32, since the communication band requested by the setting change can not be ensured, it is notified to the user that the request content can not be admitted.

As stated above, when there occurs a point where plural traffics converge as a result of the setting change, the network resource controller 10 processes these requests as described below. With respect to requests received by the request receiving unit 11, one request is a target. However, as stated above, there is a possibility that the one request includes plural setting change items. The setting request analysis unit 20 checks the node equipment and the interface as the control target for each of setting change items, classifies the requests for each of control targets, and temporality records them on the control request management unit 21. Here, the setting change items are, for example, the provision of the new VPN line and the increase of the band of the present VPN line.

Specifically, flow identification information (for example, VPN-ID, transmission source address, transmission destination address, etc.) contained in the change request is used as a search key, and the route information management unit 17 is checked. Among node equipments and interfaces on the target route, especially information relating to an edge node equipment always becomes a target. Thus, all setting change items relating to the converging point at the transmission destination are extracted. These pieces of information are classified and arranged like, for example, the entries #1 and #2 of FIG. 4 in the control request management unit 21.

In the admission control unit 22, since control requests relating to the same target node equipment and the same target interface are collectively judged, with respect to a point where plural traffics converge, it can be judged whether the combined setting changes can be admitted or not. The subsequent process is the same.

This network control system is useful for, for example, the telecommunications carrier network system to provide the interface in which the user can freely perform setting change on use services, and particularly suitable for the network system in which plural users simultaneously perform setting changes on network equipments.

What is claimed is:

1. A telecommunications system comprising:
    a plurality of node equipments that constitute a network to connect a plurality of user networks, and change setting information of a logical line between the user networks in accordance with a control request;
    a plurality of user terminals to transmit the setting information; and
    a server apparatus that receives a plurality of pieces of setting information from the plurality of user terminals and transmits control requests to the node equipments,
    wherein each of the user terminals includes:
        an input configured to input the setting information of the logical line between the user networks; and
        a transmission unit to transmit the setting information to the server apparatus, and
    wherein the server apparatus includes:
        a reception unit to receive the plurality of pieces of setting information from the plurality of user terminals
        a resource storage unit to store band information of a physical line connected to each of interfaces of the node equipments;
        a memory; and
        a processor configured to:
            classify the plurality of pieces of setting information received by the reception unit for each of the node equipments on a route of the logical line and each of the interfaces of the node equipments;
            store the classified plurality of pieces of setting information in the memory for each of the node equipments and each of the interfaces of the node equipments;
            judge whether the plurality of pieces of setting information are admissible or inadmissible based on the band information of the physical line and the plurality of pieces of setting information of the logical line with respect to the interface of each of the node equipments; and
            generate at least one control request to at least one node equipment among the plurality of node equipments based on the plurality of pieces of setting information of the logical line, which are judged to be admissible,
    wherein the reception unit receives the plurality of pieces of setting information transmitted from the plurality of user terminals simultaneously or within a certain time range, and
    wherein the processor is further configured to:
        collectively judge whether the plurality of pieces of setting information for the same node equipment and the same interface stored in the memory are admissible or inadmissible at the same time, the plurality of pieces of setting information being received from the plurality of user terminals; and
        store a judgment result in the memory.

2. The telecommunications system according to claim 1, further comprising:
    a route information management unit that stores an identifier of the node equipment on the route of the logical line and an identifier of the interface of the node equipment correspondingly to identification information of the logical line,
    wherein the processor is further configured to:
        extract the identifier of the node equipment on a communication route and the identifier of the interface of the node equipment by referring to the route information management unit based on the identifier information of the logical line included in the setting information; and
        store the setting information in the memory for each extracted identifier of the node equipment and each extracted identifier of the interface of the node equipment.

3. The telecommunications system according to claim 2, further comprising:
 a control target management unit to manage the identifier of the node equipment of a control target,
 wherein the processor is further configured to:
  check the extracted identifier of the node equipment with the identifier of the node equipment of the control target managed by the control target management unit, and
  when a check result indicates identical, store the setting information in the memory for each identifier of the node equipment of the control target and each identifier of the interface of the node equipment.

4. The telecommunications system according to claim 1, wherein the processor is further configured to, when the judgment result is inadmissible:
 sequentially delete later registered setting information;
 repeat the judgment of admissible or inadmissible;
 classify the setting information into admissible setting information and inadmissible setting information; and
 store a result in the memory.

5. The telecommunications system according to claim 1, wherein the processor is further configured to, when the judgment result is inadmissible:
 use a binary search method to classify the setting information into admissible setting information and inadmissible setting information; and
 store a result in the memory.

6. The telecommunications system according to claim 1, wherein the processor is further configured to:
 collect, in units of the same node equipment and the same interface stored in the memory, the setting information judged to be admissible; and
 generate the control request to the node equipment.

7. The telecommunications system according to claim 1, wherein in the server apparatus,
 when the setting information is received, data indicating a classification process wait for the setting information is stored in a queue,
 when a classification process is executed, data indicating an admission judgment process wait for the setting information is stored in the queue, and
 when an admission judgment process is executed, data indicating a control request publishing process wait for the setting information is stored in the queue, and
 wherein the processor is further configure to:
  collectively judge whether the plurality of pieces of setting information are admissible or inadmissible at the same time, for the plurality of pieces of setting information which correspond to the data indicating admission judgment process wait and continuously stored in the queue, and
  collectively generate the control request, for the plurality of pieces of setting information which correspond to the data indicating control request publishing process wait and continuously stored in the queue.

8. The telecommunications system according to claim 1, wherein in the server apparatus, with respect to the plurality of pieces of setting information received within a predetermined time range, the processor is further configured to:
 collectively judge whether the plurality of pieces of setting information are admissible or inadmissible at the same time; and
 collectively generate the control request for the plurality of pieces of setting information.

9. The telecommunications system according to claim 1, wherein the setting information includes one of band information of the logical line and priority.

10. The telecommunications system according to claim 1, wherein a plurality of the terminals are provided, and the reception unit of the server apparatus receives a plurality of pieces of setting information from the plurality of terminals.

11. A server apparatus in a telecommunications system including a plurality of node equipments that constitute a network to connect a plurality of user networks and change setting information of a logical line between the user networks in accordance with a control request, a plurality of user terminals to transmit the setting information, and the server apparatus that receives a plurality of pieces of setting information from the plurality of user terminals and transmits control requests to the node equipments, the server apparatus comprising:
 a reception unit to receive the plurality of pieces of setting information of the logical line between the user networks from the plurality of user terminals;
 a resource storage unit to store band information of a physical line connected to each of interfaces of the node equipments;
 a memory; and
 a processor configured to:
  classify the plurality of pieces of setting information received by the reception unit for each of the node equipments on a route of the logical line and each of the interfaces of the node equipments;
  store the plurality of pieces of setting information in the memory for each of the node equipments and each of the interfaces of the node equipments;
  judge whether the plurality of pieces of setting information are admissible or inadmissible based on the band information of the physical line and the plurality of pieces of setting information of the logical line with respect to the interface of each of the node equipments; and
  generate at least one control request to at least one node equipment among the plurality of node equipments based on the plurality of pieces of setting information of the logical line, which are judged to be admissible,
 wherein the reception unit receives the plurality of pieces of setting information transmitted from the plurality of user terminals simultaneously or within a certain time range, and
 wherein the processor is further configured to:
  collectively judge whether a plurality of pieces of setting information for the same node equipment and the same interface stored in the memory are admissible or inadmissible at the same time, the plurality of pieces of setting information being received from the plurality of user terminals; and
  store a judgment result in the memory.

12. The server apparatus according to claim 11, wherein processor is further configured to:
 extract an identifier of the node equipment on a communication route and an identifier of the interface of the node equipment by referring to a route information management unit, which stores the identifier of the node equipment on the route of the logical line and the identifier of the interface of the node equipment, based on identifier information of the logical line included in the setting information; and store the setting information in the memory for each extracted identifier of the node equipment and each extracted identifier of the interface of the node equipment.

13. The server apparatus according to claim 12, wherein the processor is further configured to:

check the extracted identifier of the node equipment with the identifier of the node equipment of a control target managed by a control target management unit that manages the identifier of the node equipment of the control target, and when a check result indicates identical, store the setting information in the memory for each identifier of the node equipment of the control target and each identifier of the interface of the node equipment.

14. The server apparatus according to claim 11, wherein the processor is further configured to, when the judgment result is inadmissible:

sequentially delete later registered setting information;

repeat the judgment of admissible or inadmissible;

classify the setting information into admissible setting information and inadmissible setting information; and store a result in the memory.

15. The server apparatus according to claim 11, wherein the processor is further configured to, when the judgment result is inadmissible:

use a binary search method to classify the setting information into admissible setting information and inadmissible setting information; and store a result in the memory.

16. The server apparatus according to claim 11, wherein the processor is further configured to:

collect in units of the same node equipment and the same interface stored in the memory, the setting information judged to be admissible; and generate the control request to the node equipment.

17. The server apparatus according to claim 11, wherein when the setting information is received, data indicating a classification process wait for the setting information is stored in a queue, wherein when a classification process is executed, data indicating an admission judgment process wait for the setting information is stored in the queue, wherein when an admission judgment process is executed, data indicating a control request publishing process wait for the setting information is stored in the queue, and wherein the processor is further configured to:

collectively judge whether the plurality of pieces of setting information are admissible or inadmissible at the same time, for the plurality of pieces of setting information which correspond to the data indicating admission judgment process wait and continuously stored in the queue, and collectively generate the control request, for the plurality of pieces of setting information which correspond to the data indicating control request publishing process wait and continuously stored in the queue.

18. The server apparatus according to claim 11, wherein, with respect to the plurality of pieces of setting information received within a predetermined time range, the processor is further configured to:

collectively judge whether the plurality of pieces of setting information are admissible or inadmissible at the same time; and collectively generate the control request for the plurality of pieces of setting information.

* * * * *